UNITED STATES PATENT OFFICE.

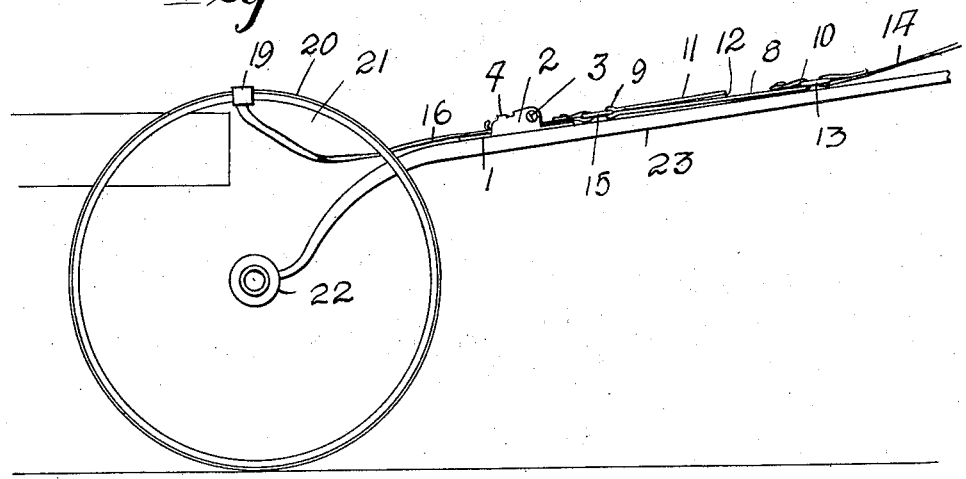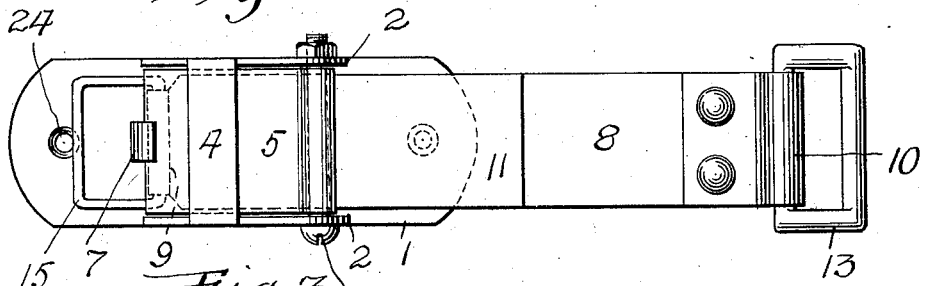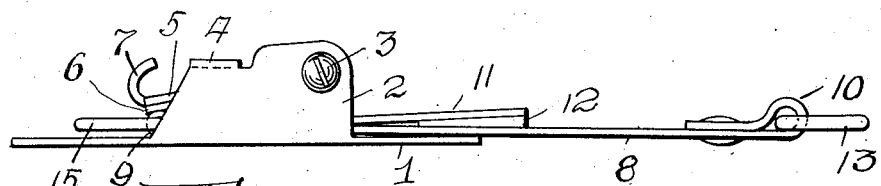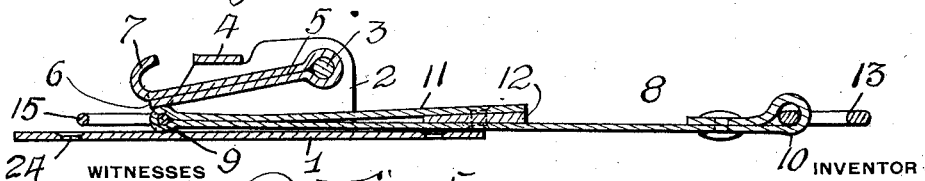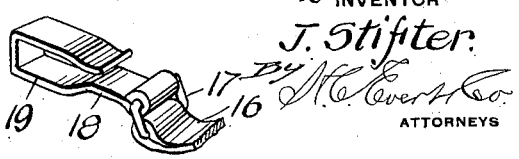

JOSEPH STIFTER, OF HOUSTON, TEXAS.

HITCHING-STRAP.

1,058,484.  Specification of Letters Patent.  Patented Apr. 8, 1913.

Application filed August 19, 1912. Serial No. 715,846.

*To all whom it may concern:*

Be it known that I, JOSEPH STIFTER, a citizen of the United States of America, residing at Houston, in the county of Harris and State of Texas, have invented certain new and useful Improvements in Hitching-Straps, of which the following is a specification, reference being had therein to the accompanying drawing.

This invention relates to hitching straps, and has for its object to provide a device of such class in a manner as hereinafter set forth to arrest the revolving of a wheel of a vehicle when an animal moves forward thereby preventing the animal from running away in view of the fact that if the animal attempts to run away it necessitates him pulling the vehicle while the wheel skids.

A further object of the invention is to provide a hitching strap adapted to be connected to the animal's bridle and to one of the wheels of a vehicle and so set up that if the animal moves forward the wheel to which the strap is attached will move for a portion of a revolution carrying the strap therewith and pull the animal's head toward its breast, under such conditions placing the animal in such position that if he attempts to run away the position of his head will be such an inconvenient one that it will cause the animal to discontinue his effort to run away.

Further objects of the invention are to provide a hitching strap for the purposes set forth which is simple in its construction and arrangement, readily attached to the vehicle and to the animal's bridle, strong, durable, automatic in its action to retard the flight of the animal, efficient in its use and comparatively inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawing:—Figure 1 is a side elevation of a portion of a vehicle showing a hitching strap in accordance with this invention connected thereto, Fig. 2 is a top plan view of a portion of the strap and the lock therefor, Fig. 3 is a side elevation of a portion of the strap, and the lock therefor, Fig. 4 is a longitudinal sectional view of a portion of the strap and the lock therefor, and Fig. 5 is a perspective view of a clamp for connecting the strap to the vehicle wheel.

Referring to the drawing in detail: 1 denotes the base plate of a lock casing having projecting therefrom a pair of uprights 2 carrying a transverse pin 3 arranged upon the plate 1. A stop member 4 is connected to the uprights 2. Pivotally mounted upon the pin 3 is a rearwardly extending latch 5 having its rear end formed with a shoulder 6 and an upturned portion 7. The stop member 4 limits the upward movement of the latch 5. Mounted upon the base plate 1 is a slide 8 having each end provided with a loop, as at 9, 10. The slide 8 is enlarged to provide a wedge-shaped portion 11 forming thereby an abutment 12 adapted to be engaged by the shoulder 6. Carried by the loop 10 is a link 13 to which a flexible member 14 is attached. The latter is adapted to be connected to the bridle of an animal. Attached to the loop 9 is a link 15 having projecting rearwardly therefrom a flexible member 16 which is attached to a loop 17 carried by the neck 18 of a spring clamp 19 which is adapted to be connected to the rim 20 and felly 21 of a vehicle wheel 22.

The plate 1 is adapted to be secured to the shaft 23 of the vehicle and for this purpose openings 24 are provided in the plate 1 for the passage of holdfast devices. It will be assumed that the member 14 has been connected to the bridle of the animal and that the member 16 is connected to the vehicle wheel by the spring clamp 19. The parts would then be in the position as shown in Fig. 1. If the animal should move forwardly, the wheel 22 will turn forwardly and pull the members 14 and 16 rearwardly, the slide 8 moving rearwardly over the plate 1 and elevating the latch 5, a further movement of the animal will cause its head to move toward its breast and will also cause the abutment 12 to be positioned rearwardly of the shoulder 6, when in this position the slide 8 cannot be pulled forward, as the shoulder 6 engaging with the abutment 12 will arrest the same, under such conditions arresting the wheel from further turning movement and also holding the animal's head against his breast and therefore it is obvious that the animal will discontinue his forward movement owing to the inconvenient position of his head and also in view of the fact that in pulling the vehicle the wheel will skid which will also tend to retard forward movement of the animal.

What I claim is:—

1. A hitching strap comprising a flexible member adapted to be attached to the bridle of an animal, a clamp adapted to be connected to the vehicle wheel, a flexible member attached to said clamp, a plate connecting said members and provided with an abutment, and means adapted to be secured to the shaft of a vehicle and capable of engaging said abutment for arresting the forward movement of said members after they have been pulled rearwardly a predetermined distance by the movement of the wheel.

2. A hitching strap comprising a forward and a rearward flexible member, said forward member adapted to be connected to the bridle of an animal, a slide, means for pivotally connecting said members to said slide, said slide provided with means to constitute an abutment, means adapted to engage with said abutment to prevent forward movement of said slide, and a clamp carried by the rear member and adapted to be connected to a vehicle wheel.

3. A hitching strap comprising a forward and a rear flexible member, said forward member adapted to be connected to the bridle of an animal, means for connecting said members together, a latch engaging with said means to prevent the forward movement of said members after being pulled rearwardly, and means carried by the rear member for connecting it to a vehicle wheel whereby when the wheel is revolved forwardly said members will be pulled rearwardly to discontinue the revolving of said wheel.

In testimony whereof I affix my signature in the presence of two witnesses.

JOSEPH STIFTER.

Witnesses:
 Jos. P. TOOKE,
 V. T. CROOK.

---

Copies of this patent may be obtained for five cents each, by addressing the "Commissioner of Patents, Washington, D. C."